(12) United States Patent
Kinasz (10) Patent No.: US 10,523,419 B2
(45) Date of Patent: Dec. 31, 2019

(54) DATA PROTECTION

(71) Applicant: IRDETO B.V., Hoofddorp (NL)

(72) Inventor: Michel Kinasz, Ottawa (CA)

(73) Assignee: IRDETO B.V., Hoofddorp (NL)

( * ) Notice: Subject to any disclaimer, the term of this patent is extended or adjusted under 35 U.S.C. 154(b) by 112 days.

(21) Appl. No.: 15/562,430

(22) PCT Filed: Mar. 30, 2015

(86) PCT No.: PCT/EP2015/056927
§ 371 (c)(1),
(2) Date: Sep. 28, 2017

(87) PCT Pub. No.: WO2016/155779
PCT Pub. Date: Oct. 6, 2016

(65) Prior Publication Data
US 2018/0091295 A1    Mar. 29, 2018

(51) Int. Cl.
*H04L 29/06* (2006.01)
*H04L 9/06* (2006.01)
(Continued)

(52) U.S. Cl.
CPC ............ *H04L 9/0618* (2013.01); *G06F 21/14* (2013.01); *G06F 21/602* (2013.01); *G06F 21/64* (2013.01); *H04L 9/002* (2013.01); *H04L 2209/16* (2013.01)

(58) Field of Classification Search
None
See application file for complete search history.

(56) References Cited

U.S. PATENT DOCUMENTS 6,567,917 B1 * 5/2003 Ziese ...................... G06F 21/64
380/279
6,594,761 B1 7/2003 Chow et al.
(Continued)

FOREIGN PATENT DOCUMENTS

CA      2 981 363 A1    10/2016
CN      108064381 A      5/2018
(Continued)

OTHER PUBLICATIONS

First Office Action received for Canadian Application Serial No. 2,981,363 dated Jul. 26, 2018, 4 pages.
(Continued)

*Primary Examiner* — Malcolm Cribbs
(74) *Attorney, Agent, or Firm* — Rimon PC (57) ABSTRACT

A method for a first entity to protect a first amount of data and to enable a second entity to perform data processing based on the first amount of data, the method comprising the first entity: applying a predetermined function to the first amount of data to generate a first value; and generating a second amount of data for the second entity to process, said generating comprising combining, using a first combination function, each of a number N of elements of the first amount of data with the first value; wherein the predetermined function is a function for which application of the predetermined function to an input quantity of data generates a corresponding output value, and the predetermined function has a property that, given a second quantity of data generated by modifying each of N elements of a first quantity of data by combining, using the first combination function, each of those N of elements of the first quantity of data with the output value generated by applying the predetermined function to the first quantity of data, the first quantity of data is regenerated from the second quantity of data by combining, using a second combination function, each of the N
(Continued)

modified elements with the output value produced by applying the predetermined function to the second quantity of data.

26 Claims, 5 Drawing Sheets

(51) Int. Cl.
*G06F 21/14* (2013.01)
*H04L 9/00* (2006.01)
*G06F 21/64* (2013.01)
*G06F 21/60* (2013.01)

(56) References Cited

U.S. PATENT DOCUMENTS

| | | | |
|---|---|---|---|
| 6,779,114 B1 | 8/2004 | Chow et al. | |
| 6,842,862 B2 | 1/2005 | Chow et al. | |
| 7,350,085 B2 | 3/2008 | Johnson et al. | |
| 7,397,916 B2 | 7/2008 | Johnson et al. | |
| 2002/0164033 A1* | 11/2002 | Rajasekaran | H04L 9/085 380/278 |
| 2002/0194484 A1* | 12/2002 | Bolosky | G06F 21/64 713/189 |
| 2007/0206786 A1* | 9/2007 | Chakraborty | H04L 63/0442 380/30 |
| 2011/0138192 A1* | 6/2011 | Kocher | G06F 21/602 713/189 |
| 2015/0180840 A1* | 6/2015 | Jung | G06F 8/654 713/150 |
| 2016/0344553 A1* | 11/2016 | Chen | G06F 21/79 |

FOREIGN PATENT DOCUMENTS

| | | |
|---|---|---|
| EP | 3 278 259 A1 | 2/2018 |
| WO | 2009/140774 A1 | 11/2009 |
| WO | 2013/139398 A1 | 9/2013 |
| WO | 2016/155779 A1 | 10/2016 |

OTHER PUBLICATIONS

International Preliminary Report on Patentability received for International Patent Application No. PCT/EP2015/056927 dated Oct. 12, 2017, 8 pages.

"Cryptographic hash function," retrieved from https://en.wikipedia.org/w/index.php?title=Cryptographic_hash_function&oldid=649145394, retrieved on Jun. 2, 2018, pp. 9.

"Hash function," retrieved from https://en.wikipedia.org/w/index.php?title=Hash_function&oldid=653189833, retrieved on Jun. 2, 2018, pp. 6.

"Inverse function," retrieved from https://en.wikipedia.org/w/index.php?title=Inverse_function&oldid=653495732, retrieved on Jun. 2, 2018, pp. 12.

"Message authentication code," retrieved from https://en.wikipedia.org/w/index.php?title=Message_authentication_code&oldid=652770498, retrieved on Jun. 2, 2018, pp. 4.

"One-way function," retrieved from https://en.wikipedia.org/w/index.php?title=One-way_function&oldid=646362893, retrieved on Jun. 2, 2018, pp. 5.

"SHA-1," retrieved from https://en.wikipedia.org/w/index.php?title=SHA-1&oldid=653785617, retrieved on Jun. 2, 2018, pp. 6.

Chow, S. et al., "White-Box Cryptography and an AES Implementation," International Workshop on Selected Areas in Cryptography, pp. 18, Feb. 17, 2003.

Chow, S. et al., "A White-Box DES Implementation for DRM Applications," Pre-proceedings for ACM DRM-2002 workshop, pp. 16, Oct. 15, 2002.

International Search Report and Written Opinion Issued by WIPO dated Dec. 16, 2015 in connection with International Application No. PCT/EP2015/056927.

Wang et al., "Tamper Resistant Software Through Dynamic Integrity Checking", SCIS 2005 The 2005 Symposium on Cryptography and Information Security Maiko Kobe, Jan. 28, 2005, Retrieved from URL: http://dspace.kaist.ac.kr/bitstream/10203/17825/1/Tamper Resistant Software Through Dynamic Integrity Checking.pdf.

* cited by examiner

DATA PROTECTION

FIELD OF THE INVENTION

The present invention relates to methods for a first entity to protect a first amount of data and to enable a second entity to perform data processing based on the first amount of data, and methods for the second entity to then perform such data processing based on the first amount of data, and apparatus and computer programs for carrying out such methods.

BACKGROUND OF THE INVENTION

A first entity X may desire to send an amount of data $D_1$ to a second entity Y. The communication channel between the first entity X and the second entity Y may be an insecure or untrusted channel, insofar as data communicated across this channel may be inadvertently modified (due to noise on the channel) and/or may be deliberately modified (e.g. a malicious attacker may modify data communicated across this channel and/or a malicious attacker may include or inject new data into the communication channel, potentially whilst "pretending" to be the first entity X). The second entity Y may therefore receive data $D_2$, where (a) the received data $D_2$ may be the same as the initial data $D_1$ (if no modification or corruption of the initial amount of data $D_1$ has occurred), (b) the received data $D_2$ may be a modified version of the initial data $D_1$ sent by the first entity X to the second entity Y (e.g. if there has been noise added by the communication channel and/or modifications by an attacker) or (c) the received data $D_2$ may be new data not originating from, or not based on data sent by, the first entity X (e.g. if an attacker is trying to introduce new/malicious data whilst pretending to be the entity X). The second entity Y may wish to only process (or provide functionality based on) the received data $D_2$ if the second entity Y has confidence that the received data $D_2$ originated from the first entity X and/or only process (or provide functionality based on) the received data $D_2$ if the second entity Y has confidence in the integrity of the received data $D_2$ (i.e. process data that has not been modified, or, put another way, only provide functionality if the received data $D_2$ is the same as the initial data $D_1$ that the first entity X sent to the second entity Y).

Figure 1:
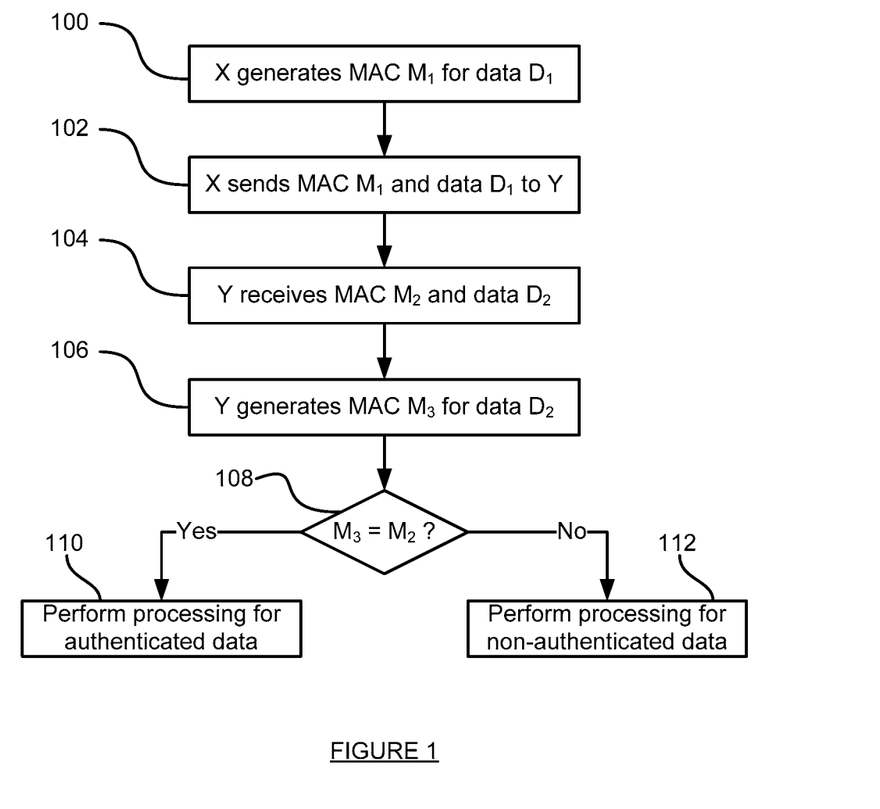
FIG. 1 is a flowchart illustrating the use of a MAC.

It is well-known to use a message authentication code (MAC) to address this situation. FIG. 1 of the accompanying drawings is a flowchart illustrating the use of a MAC.

At a step 100, the first entity X generates a MAC for the initial data $D_1$. In particular, the first entity X generates a MAC $M_1$, which is an amount of data or a value (e.g. a checksum) based on the data $D_1$, using a MAC function F, i.e. $M_1=F(D_1)$. In general, the MAC function F is a keyed (or cryptographic) hash function or a so-called keyed (or cryptographic) one-way-function. In other words, the function F may use a secret key K shared by both the first entity X and the second entity Y so that only the first entity X and the second entity Y know the configuration/settings for the MAC function F that is to be performed. Additionally, the MAC function F is a function such that, given the MAC value $M_1$ (and possibly even the key K) it is computationally infeasible to create a further amount of data $D^*$ such that $F(D^*)=M_1$. An example of such a MAC function (or algorithm or process) is SHA-1, details of which can be found at http://en.wikipedia.org/wiki/SHA-1 (the entire contents of which are incorporated herein by reference).

At a step 102, the first entity X sends both the amount of data $D_1$ and the MAC $M_1$ to the second entity Y.

At a step 104, the second entity Y receives an amount of data $D_2$ and a value $M_2$. The second entity will use, or treat, the value $M_2$ as a MAC value which is meant to correspond to the received data $D_2$. If the data sent over the communication channel has not been corrupted or modified, then the amount of data $D_2$ is the amount of data $D_1$ and the MAC value $M_2$ is the MAC value $M_1$. However, if there has been corruption of the data sent over the communication channel it is possible that the amount of data $D_2$ is different from the amount of data $D_1$ and/or the MAC value $M_2$ is different from the MAC value $M_1$. Indeed, if an attacker has introduced completely new data into the communication channel and sent that new data to the second entity Y, then the amount of data $D_2$ may be completely unrelated to the amount of data $D_1$ and the MAC value $M_2$ may be completely unrelated to the MAC value $M_1$. However, the second entity Y can distinguish between valid (i.e. uncorrupted or authentic) data and invalid (i.e. corrupted or inauthentic) data, as set out below.

At a step 106, the second entity may generate a MAC $M_3$ based on the received amount of data $D_2$, i.e. $M_3=F(D_2)$. The second entity Y uses the same MAC function F, configured in the same way as for the first entity X (e.g. using the same key K), as was used by the first entity X at the step 100 when the first entity X generated the MAC $M_1$ based on the initial data $D_1$.

At a step 108, the second entity Y performs a comparison operation to determine whether the received MAC $M_2$ is the same as the generated MAC $M_3$ (i.e. whether $M_3=M_2$).

If the received MAC $M_2$ is the same as the generated MAC $M_3$ (i.e. if $M_3=M_2$), then at a step 110, the second entity Y can assume that (a) the received data ($D_2$ and $M_2$) is the same as the initial data ($D_1$ and $M_1$) sent by the first entity X and (b) the received data ($D_2$ and $M_2$) originated from the first entity X. This is because only the first and second entities share the secret K and because it is computationally infeasible for an attacker to create a further amount of data $D^*$ such that $F(D^*)=M_1$. Therefore, at the step 110, the second entity Y may perform data processing on the basis that the received data ($D_2$ and $M_2$) is authentic (i.e. on the basis that the integrity and origin of the received data ($D_2$ and $M_2$) have been successfully verified).

If, on the other hand, the received MAC $M_2$ is not the same as the generated MAC $M_3$ (i.e. if $M_3 \neq M_2$), then at a step 112, the second entity Y can assume that (a) the received data ($D_2$ and $M_2$) is not the same as the initial data ($D_1$ and $M_1$) sent by the first entity X and/or (b) the received data ($D_2$ and $M_2$) did not originate from the first entity X. Therefore, at the step 112, the second entity Y may perform data processing on the basis that the received data ($D_2$ and $M_2$) is not authentic (i.e. on the basis that the integrity and/or origin of the received data ($D_2$ and $M_2$) have not been successfully verified).

More information on MACs and how they can be used can be found at http://en.wikipedia.org/wiki/Message_authentication_code (the entire contents of which are incorporated herein by reference).

A "white-box" environment is an execution environment for an item of software in which an attacker of the item of software is assumed to have full access to, and visibility of, the data being operated on (including intermediate values), memory contents and execution/process flow of the item of software. Moreover, in the white-box environment, the attacker is assumed to be able to modify the data being operated on, the memory contents and the execution/process flow of the item of software, for example by using a debugger in this way, the attacker can experiment on, and try to manipulate the operation of, the item of software, with the aim of circumventing initially intended functionality and/or identifying secret information and/or for other purposes. Indeed, one may even assume that the attacker is aware of the underlying algorithm being performed by the item of software. However, the item of software may need to use secret information (e.g. one or more cryptographic keys), where this information needs to remain hidden from the attacker. Similarly, it would be desirable to prevent the attacker from modifying the execution/control flow of the item of software, for example preventing the attacker forcing the item of software to take one execution path after a decision block instead of a legitimate execution path.

There are numerous techniques, referred to herein as "white-box obfuscation techniques", for transforming the item of software 12 so that it is resistant to white-box attacks. Examples of such white-box obfuscation techniques can be found, in "*White-Box Cryptography and an AES Implementation*", S. Chow et al, Selected Areas in Cryptography, 9th Annual International Workshop, SAC 2002, Lecture Notes in Computer Science 2595 (2003), p 250-270 and "*A White-box DES Implementation for DRM Applications*", S. Chow et al, Digital Rights Management, ACM CCS-9 Workshop, D R M 2002, Lecture Notes in Computer Science 2696 (2003), p 1-15, the entire disclosures of which are incorporated herein by reference. Additional examples can be found in U.S. 61/055,694 and WO2009/140774, the entire disclosures of which are incorporated herein by reference. Some white-box obfuscation techniques implement data flow obfuscation see, for example, U.S. Pat. Nos. 7,350,085, 7,397,916, 6,594,761 and 6,842,862, the entire disclosures of which are incorporated herein by reference. Some white-box obfuscation techniques implement control flow obfuscation see, for example, U.S. Pat. Nos. 6,779,114, 6,594,761 and 6,842,862 the entire disclosures of which are incorporated herein by reference. However, it will be appreciated that other white-box obfuscation techniques exist.

SUMMARY OF THE INVENTION

It will be appreciated that the use of MACs as described above with reference to FIG. 1 requires the second entity Y to perform a comparison operation (namely the step 108 above). This presents a potential weakness when the MAC verification is implemented in software. In particular, if that software is executed in a white-box environment, then an attacker may be able to identify the particular point in the execution of the software at which the comparison for the step 108 is performed and may be able to force the software to execute the step 110 (i.e. perform processing as if authentication of the MAC was successful) even if the step 108 determined that $M_3 \ne M_2$ (i.e. authentication was not successful). Indeed, an attacker may be able to modify the execution flow of the software so that the execution omits the steps 106 and 108 altogether, thereby causing the software to perform processing at the step 110 after receiving an amount of data $D_2$ at the step 104. In other words, an attacker may be able to bypass the MAC checking process in a variety of ways in order to carry out processing on data $D_2$ that may not be valid. The attacker may wish to do this, for example, to cause the software to perform unintended functionality (e.g. by being able to feed the software with a carefully crafted data $D_2$). It would be desirable to be able to provide a mechanism that addresses this problem.

In other words, it would be desirable to enable an entity (the above-mentioned second entity Y) to only provide intended functionality/processing (i.e. functionality that the entity desires or expects or which is useful to the entity) based on received data if the origin and integrity of the received data are valid, and to provide unintended functionality/processing (i.e. functionality that the entity does not desire or expect or which is not useful to the entity) if the origin and/or integrity of the received data are invalid, but without having to perform an explicit verification step such as the step 108 in FIG. 1.

According to a first aspect of the invention, there is provided a method for a first entity to protect a first amount of data and to enable a second entity to perform data processing based on the first amount of data, the method comprising the first entity: applying a predetermined function to the first amount of data to generate a first value; and generating a second amount of data for the second entity to process, said generating comprising combining, using a first combination function, each of a number N of elements of the first amount of data with the first value; wherein the predetermined function is a function for which application of the predetermined function to an input quantity of data generates a corresponding output value, and the predetermined function has a property that, given a second quantity of data generated by modifying each of N elements of a first quantity of data by combining, using the first combination function, each of those N of elements of the first quantity of data with the output value generated by applying the predetermined function to the first quantity of data, the first quantity of data is regenerated from the second quantity of data by combining, using a second combination function, each of the N modified elements with the output value produced by applying the predetermined function to the second quantity of data.

In some embodiments, the method comprises providing the second amount of data to the second entity.

According to a second aspect of the invention, there is provided a method for a second entity to perform data processing based on a first amount of data, the method comprising the second entity: obtaining a second amount of data; applying a predetermined function to the second amount of data to generate a second value; generating the first amount of data by combining, using a second combination function, each of a number N of elements of the second amount of data with the second value; and performing the data processing based on the generated first amount of data; wherein the predetermined function is a function for which application of the predetermined function to an input quantity of data generates a corresponding output value, and the predetermined function has a property that, given a second quantity of data generated by modifying each of N elements of a first quantity of data by combining, using a first combination function, each of those N of elements of the first quantity of data with the output value generated by applying the predetermined function to the first quantity of data, the first quantity of data is regenerated from the second quantity of data by combining, using the second combination function, each of the N modified elements with the output value produced by applying the predetermined function to the second quantity of data.

In some embodiments, the method comprises the first entity: applying a predetermined function to the first amount of data to generate a first value; and generating the second amount of data by combining, using the first combination function, each of N elements of the first amount of data with the first value.

In some embodiments of the first aspect and the second aspect, the predetermined function has a property that it is computationally infeasible to determine a third quantity of data, different from the second quantity of data, from which the first quantity of data is regenerated by combining, using the second combination function, each of N elements of the third quantity of data with the output value produced by applying the predetermined function to the third quantity of data.

In some embodiments of the first aspect and the second aspect, the N elements are chosen based on a key.

In some embodiments of the first aspect and the second aspect, the predetermined function is a function s defined by: $s(w)=a \times b^N + \Sigma_{i=0}^{N-1}(w_i \times b^{N-1-i})$ where: w is an input quantity of data and s(w) is a corresponding output value generated by the predetermined function corresponding to the amount of data w; a and b are predetermined values; and $w_0, w_1, \ldots, w_{N-1}$ are N elements of the amount of data w.

Here, a and b may be values determined based on a key.

The quantity of data w may comprise an ordered sequence of at least N elements and the N elements $w_0, w_1, \ldots, w_{N-1}$ are randomly selected from the ordered sequence of at least N elements. The random selection may be seeded by a key.

Said combining, using the first combination function, each of N of elements of the first quantity of data with the output value generated by applying the predetermined function to the first quantity of data may comprise, for $i=0, \ldots, N-1$, adding s(w) to $w_i$ using modulo arithmetic to generated the respective modified element $w'_i$. Additionally, said combining, using the second combination function, each of the N modified elements with the output value produced by applying the predetermined function to the second quantity of data may comprise, for $i=0, \ldots, N-1$, subtracting $s(w') \times (1+\Sigma_{i=0}^{N-1} b^{N-1-i})^{-1}$ from $w'_i$, where w' is the second quantity of data.

In some embodiments of the first aspect and the second aspect, the first amount of data or the second amount of data has a total number M of elements, wherein N=M.

In some embodiments of the first aspect and the second aspect, the first amount of data or the second amount of data has a total number M of elements, wherein N<M.

According to a third aspect of the invention, there is provided an apparatus arranged to carry out any one of the above-described methods.

According to a fourth aspect of the invention, there is provided a computer program which, when executed by one or more processors, causes the one or more processors to carry out any one of the above-described methods. The computer program may be stored on a computer-readable medium.

BRIEF DESCRIPTION OF THE DRAWINGS

Embodiments of the invention will now be described, by way of example only, with reference to the accompanying drawings, in which.

DETAILED DESCRIPTION OF EMBODIMENTS OF THE INVENTION

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader spirit and scope of the invention as set forth in the appended claims.

Figure 2:
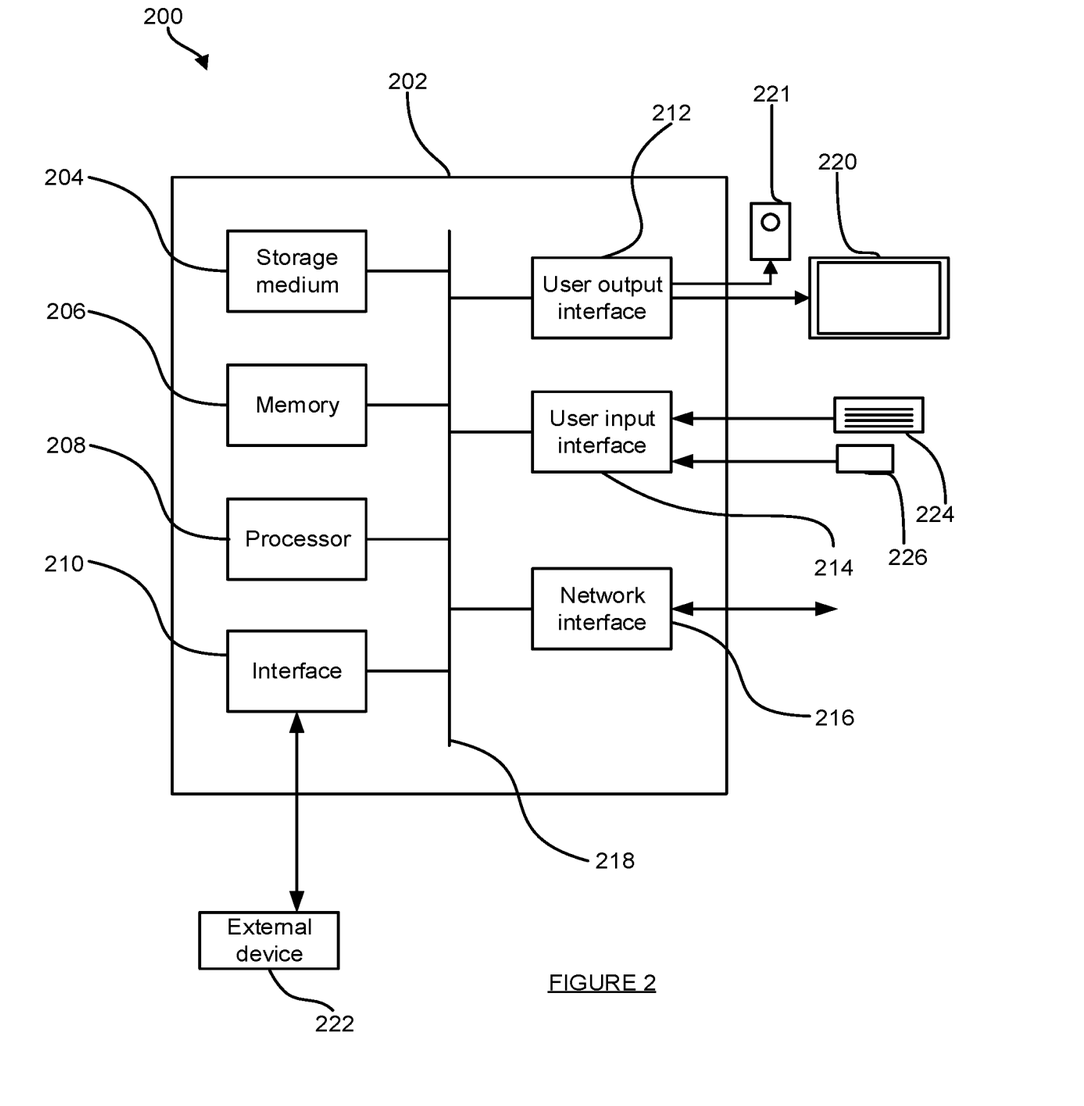
FIG. 2 schematically illustrates an example of a computer system.

FIG. 2 schematically illustrates an example of a computer system 200. The system 200 comprises a computer 202. The computer 202 comprises: a storage medium 204, a memory 206, a processor 208, an interface 210, a user output interface 212, a user input interface 214 and a network interface 216, which are all linked together over one or more communication buses 218.

The storage medium 204 may be any form of non-volatile data storage device such as one or more of a hard disk drive, a magnetic disc, an optical disc, a ROM, etc. The storage medium 204 may store an operating system for the processor 208 to execute in order for the computer 202 to function. The storage medium 204 may also store one or more computer programs (or software or instructions or code).

The memory 206 may be any random access memory (storage unit or volatile storage medium) suitable for storing data and/or computer programs (or software or instructions or code).

The processor 208 may be any data processing unit suitable for executing one or more computer programs (such as those stored on the storage medium 204 and/or in the memory 206), some of which may be computer programs according to embodiments of the invention or computer programs that, when executed by the processor 208, cause the processor 208 to carry out a method according to an embodiment of the invention and configure the system 200 to be a system according to an embodiment of the invention. The processor 208 may comprise a single data processing unit or multiple data processing units operating in parallel, separately or in cooperation with each other. The processor 208, in carrying out data processing operations for embodiments of the invention, may store data to and/or read data from the storage medium 204 and/or the memory 206.

The interface 210 may be any unit for providing an interface to a device 222 external to, or removable from, the computer 202. The device 222 may be a data storage device, for example, one or more of an optical disc, a magnetic disc, a solid-state-storage device, etc. The device 222 may have processing capabilities for example, the device may be a smart card. The interface 210 may therefore access data from, or provide data to, or interface with, the device 222 in accordance with one or more commands that it receives from the processor 208.

The user input interface 214 is arranged to receive input from a user, or operator, of the system 200. The user may provide this input via one or more input devices of the system 200, such as a mouse (or other pointing device) 226 and/or a keyboard 224, that are connected to, or in communication with, the user input interface 214. However, it will be appreciated that the user may provide input to the computer 202 via one or more additional or alternative input devices (such as a touch screen). The computer 202 may store the input received from the input devices via the user input interface 214 in the memory 206 for the processor 208 to subsequently access and process, or may pass it straight to the processor 208, so that the processor 208 can respond to the user input accordingly.

The user output interface 212 is arranged to provide a graphical/visual and/or audio output to a user, or operator, of the system 200. As such, the processor 208 may be arranged to instruct the user output interface 212 to form an image/video signal representing a desired graphical output, and to provide this signal to a monitor (or screen or display unit) 220 of the system 200 that is connected to the user output interface 212. Additionally or alternatively, the processor 208 may be arranged to instruct the user output interface 212 to form an audio signal representing a desired audio output, and to provide this signal to one or more speakers 221 of the system 200 that is connected to the user output interface 212.

Finally, the network interface 216 provides functionality for the computer 202 to download data from and/or upload data to one or more data communication networks.

It will be appreciated that the architecture of the system 200 illustrated in FIG. 2 and described above is merely exemplary and that other computer systems 200 with different architectures (for example with fewer components than shown in FIG. 2 or with additional and/or alternative components than shown in FIG. 2) may be used in embodiments of the invention. As examples, the computer system 200 could comprise one or more of: a personal computer; a server computer; a mobile telephone; a tablet; a laptop; a television set; a set top box; a games console; other mobile devices or consumer electronics devices; etc.

Figure 3:
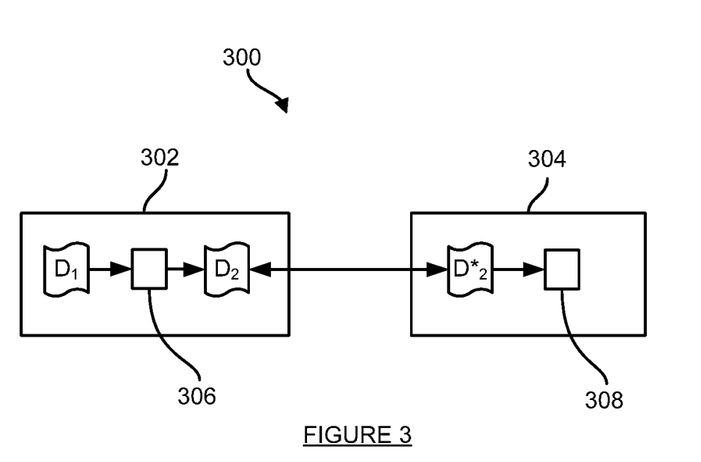
FIG. 3 schematically illustrates a system according to an embodiment of the invention.

FIG. 3 schematically illustrates a system 300 according to an embodiment of the invention. The system 300 comprises a first entity 302 and a second entity 304, where the first entity 302 wishes to protect (or secure) an amount (or quantity or chunk) of data $D_1$ so that the second entity 304 can perform data processing on (or using) that amount of data $D_1$. The nature or type of this data processing by the second entity 304 could be any kind of data processing, and is not important to embodiments of the invention.

As will be described in more detail shortly, the first entity 302 is arranged to protect the initial amount of data $D_1$ by generating a new/protected amount of data $D_2$ and providing that protected amount of data $D_2$ to the second entity 304 (or at least making the protected amount of data $D_2$ available or accessible to the second entity 304). The first entity 302 may comprise (or execute) a protection module 306 that is arranged to protect the initial amount of data $D_1$ by generating the protected amount of data $D_2$.

The second entity 304 obtains (e.g. receives or fetches or accesses) an amount of data $D_2^*$. In the absence of an attack by an attacker, and in the absence of any other corruption (e.g. the introduction of noise), the data $D_2^*$ will be the same as the protected data $D_2$. However, if the protected data $D_2$ has been corrupted before it is received or obtained by the second entity 304 (e.g. by the introduction of noise into the protected data $D_2$ during its transmission over a noisy communication channel to the second entity 304, or by an attacker who is eavesdropping on the communication channel between the first entity 302 and the second entity 304 modifying the protected data $D_2$), then the data $D_2^*$ will not be the same as the protected data $D_2$. Thus, the data $D_1$ may be considered a first amount of data, and both the protected data $D_2$ and the received/obtain data $D_2^*$ may be considered a second amount of data (where $D_2^*$ is potentially a version of $D_2$, and equals $D_2$ if there has been no corruption to $D_2$ from its generation by the first entity 302 to it being obtained/received by the second entity 304).

The second entity 304 processes the obtained data $D_2^*$. The second entity 304 may comprise (or execute) a processing module 308 for processing the obtained data $D_2^*$. The processing of the received data $D_2^*$ by the second entity 304 is arranged so that: (a) if the protected data $D_2$ has not been modified by an attacker, or has not been otherwise corrupted, so that the data $D_2^*$ that the second entity 304 processes is the same as the protected data $D_2$, then the processing of the data $D_2^*$ results in the second entity 304 performing the data processing based on the original data $D_1$; whilst (b) if the protected data $D_2$ has been modified by an attacker, or has been otherwise corrupted, so that the data $D_2^*$ that the second entity 304 processes is not the same as the protected data $D_2$, or if the data $D_2^*$ that the second entity 304 processes does not originate from the first entity 302 (e.g. if an attacker is performing a data injection attack), then the processing of the data $D_2^*$ results in the second entity 304 performing data processing which does not provide the attacker with a desired or useful result (i.e. not a result based on the initial data $D_1$). Moreover, this is achieved without performing an explicit authentication/validation step/test of the form of the step 108 in FIG. 1, which means that an attack point has been removed so that the security of processing at the second entity 304 has been increased.

The first entity 302 may be an item of software (i.e. some or all of a computer program or code/instructions), in which case the first entity 302 may be executed on a processor of a computer system such as the computer system 200 of FIG. 2. The protection module 306 may then be a portion of code or instructions of the item of software. Alternatively, the first entity 302 may be a hardware device and could, for example, itself comprise a computer system such as the computer system 200 of FIG. 2. The protection module 306 may then be a portion of code or instructions executed by the first entity 302 or may be a hardware module of the first entity 302. The first entity 302 may have generated the data $D_1$ itself or may have received the data $D_1$ from another source (not shown in FIG. 3).

Similarly, the second entity 304 may be an item of software (i.e. some or all of a computer program or code/instructions), in which case the second entity 304 may be executed on a processor of a computer system such as the computer system 200 of FIG. 2. The processing module 308 may then be a portion of code or instructions of the item of software. Alternatively, the second entity 304 may be a hardware device and could, for example, itself comprise a computer system such as the computer system 200 of FIG. 2. The processing module 308 may then be a portion of code or instructions executed by the second entity 304 or may be a hardware module of the second entity 304. The second entity 304 may have obtained the data $D_2^*$ directly from the first entity 302; alternatively, the first entity 302 may have generated the protected data $D_2$ and provided that protected data $D_2$ to one or more intermediaries (other entities, storage/memory, etc.) so that the second entity 304 ultimately obtains the data $D_2^*$ via those one or more intermediaries.

The first entity 302 may be the same entity as the second entity 304. For example, the first entity 302 may be an item of software that generates the protected data $D_2$ for the same item of software (now referred to as the second entity 304) to process at some point later on. Similarly, the first entity 302 may be a computer system whose protection module 306 generates the protected data $D_2$ for a processing module 308 of the same computer system (now referred to as the second entity 304) to process at some point later on.

The first entity 302 and the second entity 304 may be arranged to communicate with each other. For example, the first entity 302 may be arranged to transmit or send the protected data $D_2$ to the second entity 304, or the second entity 304 may be arranged to obtain or fetch the protected data $D_2$ from the first entity 302, via a network (not shown in FIG. 3). The network may be any kind of data communication network suitable for communicating or transferring data between the first entity 302 and the second entity 304.

Thus, the network may comprise one or more of: a local area network, a wide area network, a metropolitan area network, the Internet, a wireless communication network, a wired or cable communication network, a satellite communications network, a telephone network, etc. The first entity 302 and the second entity 304 may be arranged to communicate with each other via the network via any suitable data communication protocol. For example, when the network is the Internet, the data communication protocol may be HTTP.

Figure 4:
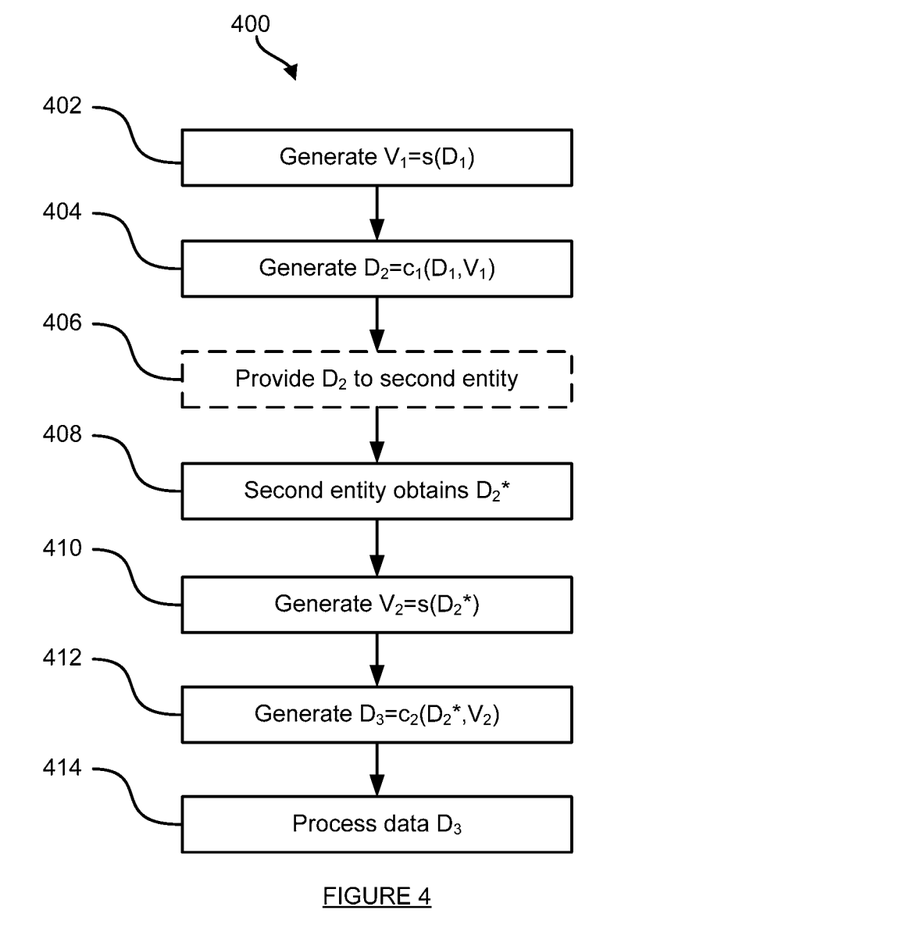
FIG. 4 is a flowchart illustrating a method according to an embodiment of the invention.

With this in mind, FIG. 4 is a flowchart illustrating a method 400 according to an embodiment of the invention. As described above, embodiments of the invention concern the first entity 302 protecting a first amount of data $D_1$ to thereby enable the second entity 304 to perform data processing based on the first amount of data $D_1$.

At a step 402, the first entity 302 applies a predetermined function, referred to herein as a function s, to the data $D_1$, to generate a first value $V_1=s(D_1)$. In other words, the first entity 302 generates a first value $V_1$, based on (or corresponding to) the data $D_1$, using a predetermined function s. The nature and size of the data $D_1$ is not important, i.e. the data $D_1$ may relate to any kind of data (e.g. audio data, video data, software code, financial data, etc.) and may be of an arbitrary size. The nature of the predetermined function s shall be described in more detail shortly.

At a step 404, the first entity 302 generates (or creates or forms) the protected data $D_2$. This is achieved by combining, using a first combination function $c_1$, each of a number N of elements of the data $D_1$ with the first value $V_1$, i.e. $D_2=c_1(D_1,V_1)=c_1(D_1,s(D_1))$. In other words, each of these N elements of the data $D_1$ are modified based on the first value $V_1$, using the first combination function $c_1$. The nature of the first combination function $c_1$ shall be described in more detail shortly.

Herein, the term "element" refers to a number of bits or bytes of an amount or quantity of data (which may or may not be consecutive or contiguous bits or bytes within that amount or quantity of data). Thus, each of these N elements of the data $D_1$ is a number of respective bits or bytes of the data $D_1$. Preferably, the N elements are non-overlapping within the data $D_1$ (i.e. they do not share, or have in common, any bits or bytes of the data $D_1$). If N>1, then in some embodiments all of the N elements have the same number of bits or bytes, but this need not necessarily be the case in other embodiments.

As will be appreciated, N is a positive integer.

The initial data $D_1$ may comprise a total number M of elements, where M≥N. If N=M, then all of the elements of the initial data $D_1$ are modified at the step 404 in order to generate the protected data $D_2$ and, therefore, protection is provided against modification or corruption of any part of the protected data $D_2$. However, in some embodiments, N may be less that M, so that not all (i.e. only a subset) of the elements of the initial data $D_1$ are modified at the step 404 in order to generate the protected data $D_2$ and, therefore, protection may be provided against modification or corruption of only part of the protected data $D_2$.

The number N may be predetermined or may be varied (e.g. depending on how many elements are present in total in the initial data $D_1$).

Thus, if the N elements of the data $D_1$ that are to be modified at the step 404 are elements $E_0, \ldots, E_{N-1}$, then the first combination function $c_1$ operates by combining each of $E_0, \ldots, E_{N-1}$ with the first value $V_1$ to produce respective modified elements $E_0^*, \ldots, E_{N-1}^*$. The protected data $D_2$ is, therefore, the first amount of data $D_1$ with the elements $E_0, \ldots, E_{N-1}$ replaced by the modified elements $E_0^*, \ldots, E_{N-1}^*$.

At an optional step 406, the protected data $D_2$ is provided to the second entity 304. This is an optional step because, for example: the first entity 302 may be the same entity as the second entity 304, in which case the second entity 304 will already have (or have access to) the protected data $D_2$; or the second entity 304 may be arranged to fetch (as opposed to being provided) the protected data $D_2$ from the first entity 302. The step 406 may therefore be a step of making the protected data $D_2$ accessible to the second entity 304.

The steps 402 and 404 (and possibly the step 406 too) may be performed by the protection module 306.

At a step 408, the second entity 304 obtains the data $D_2^*$. The intention is that the second entity 304 obtains the protected data $D_2$ that the first entity 302 created at the step 404. As discussed above, in the absence of an attack by an attacker, and in the absence of any other corruption (e.g. the introduction of noise), the data $D_2^*$ will be the same as the protected data $D_2$. However, if subsequent to the step 404 and before the step 408 the protected data $D_2$ has been corrupted (e.g. by the introduction of noise over a noisy communication channel or by an attacker modifying the protected data $D_2$), then the data $D_2^*$ will not be the same as the protected data $D_2$. Indeed, if an attacker is performing an attack by providing the second entity 304 with new data, then the data $D_2^*$ that the second entity 304 obtains at the step 408 may be unrelated to any protected data $D_2$ that the first entity has created at the step 404.

The second entity 304 may obtain the data $D_2^*$ by, for example, receiving or fetching the data $D_2^*$ from the first entity 302 (if, for example, the second entity 304 is in communication with the first entity via a network 302, then the second entity 304 may receive or fetch the data $D_2^*$ from the first entity 302 via the network). Similarly, if the second entity 304 is the same entity as the first entity 302, then the second entity 304 may obtain the data $D_2^*$ from a memory or database or store into which the first entity 302 stored or recorded the protected data $D_2$.

At a step 410, the second entity 304 applies the same predetermined function s to the data $D_2^*$ to generate a second value $V_2=s(D_2^*)$. In other words, the second entity 304 generates a second value $V_2$, based on (or corresponding to) the data $D_2^*$, using the predetermined function s.

At a step 412, the second entity 304 generates (or creates or forms) a third amount of data $D_3$. This is achieved by combining, using a second combination function $c_2$, each of N (the same above-mentioned number used at the step 404) elements of the data $D_2^*$ with the second value $V_2$, i.e. $D_3=c_2(D_2^*,V_2)=c_2(D_2^*,s(D_2^*))$. In other words, each of these N elements of the data $D_2^*$ are modified based on the second value $V_2$, using the second combination function $c_2$. The nature of the second combination function $c_2$ shall be described in more detail shortly.

Thus, if the N elements of the data $D_2^*$ are elements $G_0, \ldots, G_{N-1}$, then the second combination function $c_2$ operates by combining each of $G_0, \ldots, G_{N-1}$ with the second value $V_2$ to produce respective modified elements $G_0^*, \ldots, G_{N-1}^*$. The third amount of data $D_3$ is, therefore, the data $D_2^*$ with the elements $G_0, \ldots, G_{N-1}$ replaced by the modified elements $G_0^*, \ldots, G_{N-1}^*$.

The N elements of the data $D_2^*$, $G_0, \ldots, G_{N-1}$ correspond to the N elements $E_0, \ldots, E_{N-1}$ of the initial data $D_1$ (or, equivalently, correspond to the N elements $E_0^*, \ldots, E_{N-1}^*$ of the protected data $D_2$) in that, for i=0, . . . , N−1, the element $G_i$ is (a) of the same number of bits or bytes as the corresponding element $E_i$ or $E_i^*$ and (b) is formed from bits or bytes at the same/corresponding location within $D_2^*$ as the location of the bits or bytes forming the corresponding element $E_i$ or $E_i^*$ within the initial data $D_1$ or the protected data $D_2$ respectively. Thus, if there has been no attack on, or corruption of, the protected data $D_2$, so that $D_2=D_2^*$, then $G_i=E_i^*$ (for i=0, ..., N−1).

At a step 414, the second entity 304 performs its data processing based on the third amount of data $D_3$ generated at the step 412. As discussed above, this could be any kind of data processing, and the nature of this data processing is not important to embodiments of the invention.

The steps 408, 410, 412 and 414 may be carried out by the processing module 308.

As shall be described in more detail shortly, if there has been no attack on, or corruption of, the protected data $D_2$, so that $D_2=D_2^*$, then $G_i^*=E_i$ (for i=0, ..., N−1) which means that the third amount of data $D_3$ is the same as the first amount of data $D_1$. Thus, if there has been no attack on, or corruption of, the protected data $D_2$, then the second entity 304 is able to perform its data processing based on the first amount of data $D_1$ that has been regenerated at the second entity 304 (since the second entity 304 performs its processing using the data $D_3$, which would be equal to $D_1$ in this situation). On the other hand, if there has been an attack on, or corruption of, the protected data $D_2$, so that $D_2 \neq D_2^*$, then at least one modified element $G_i^*$ will be different from the corresponding initial element $E_i$ of the initial data $D_1$, which means that the third amount of data $D_3$ will be different from the first amount of data $D_1$. Thus, if there has been an attack on, or corruption of, the protected data $D_2$, then the second entity 304 is not able to perform its data processing based on the first amount of data $D_1$ but will, instead, perform its data processing based on a different amount of data $D_3$. Embodiments of the invention are, therefore, particularly suitable to situations in which the data processing by the second entity 304 is particularly sensitive to the input data being processed, i.e. to situations in which a small change to $D_3$ (e.g. just a change of one bit of $D_3$) produces a large change in the output of the data processing of the second entity 304. This could happen, for example, if the data $D_3$ were used by the second entity 304 as a cryptographic key, were used by the second entity 304 as a seed (e.g. for a random number generator), were used by the second entity 304 as an input to a cryptographic process, etc.

Thus, the predetermined function s is a function for which application of the predetermined function s to an input quantity of data w generates a corresponding output value, and the predetermined function s has a property that, given a second quantity of data w' generated by modifying each of N elements of the first quantity of data w by combining, using the first combination function $c_1$, each of those N elements of the first quantity of data w with the output value $v_1$ generated by applying the predetermined function s to the first quantity of data w, then the first quantity of data w is, or can be, regenerated from the second quantity of data w' by combining, using the second combination function $c_2$, each of the N modified elements with the output value $v_2$ produced by applying the predetermined function s to the second quantity of data w'. Put another way, the functions s, $c_1$ and $c_2$ satisfy the following relationship:

$$w = c_2(w', v_2)$$
$$= c_2(w', s(w'))$$

-continued
$$= c_2(c_1(w, v_1), s(c_1(w, v_1)))$$
$$= c_2(c_1(w, s(w)), s(c_1(w, s(w))))$$

Thus, in the context of FIGS. 3 and 4:

The first entity 302 generates $D_2=c_1(D_1,V_1)=c_1(D_1,s(D_1))$

The second entity 304 generates $D_3=c_2(D_2^*,V_2)=c_2(D_2^*,s(D_2^*))$

Thus, if there has been no attack on, or corruption of, the protected data $D_2$, so that $D_2^*=D_2$, then $$D_3=c_2(D_2^*,s(D_2^*))=c_2(D_2,s(D_2))=c_2(c_1(D_1,s(D_1)),s(c_1(D_1,s(D_1))))=D_1$$

so that the second entity 304, when processing the generated data $D_3$, will be processing the original data $D_1$.

Preferably the predetermined function s has a property that it is computationally infeasible to determine a third quantity of data w", different from the second quantity of data w', from which the first quantity of data w is regenerated by combining, using the second combination function $c_2$, each of N elements of the third quantity of data w" with the output value $v_3$ produced by applying the predetermined function to the third quantity of data w". Put another way, it is preferable if it is computationally infeasible for an attacker to identify a third quantity of data w" so that $c_2(w",v_3)=w$, i.e. so that $c_2(w",s(w"))=w$. Thus, in the context of FIGS. 3 and 4, this helps prevent an attacker from creating and supplying the second entity 304 with data $D_2^*$ so that $c_2(D_2^*,s(D_2^*))=D_3$ for some desired/target data $D_3$ that the attacker wished the second entity 304 to process.

The second entity 304 (or at least the processing module 308) may be implemented in a manner that provides protection against white-box attacks i.e. attacks that can be launched when (or rely on the fact that) the second entity 304, or the processing module 308, may operate or execute in a white-box environment. As discussed above, white-box obfuscation techniques are known and therefore shall not be described in more detail herein. These techniques provide a degree of protection against attempts by attackers to misuse, or hack, the second entity 304 (or the processing module 308). Whether or not the second entity 304 (or the processing module 308) is implemented in a manner that provides protection against white-box attacks, embodiments of the invention provide increased security (or at least make it more difficult for an attacker to successfully launch an attack against the second entity 304, or the processing module 308) due to the absence of the explicit verification step 108 that is adopted when using MACs.

Examples of the functions s, $c_1$ and $c_2$ are given below.

Let w be a quantity of data. Let the N elements of the quantity of data w each be a number m of respective bits taken from w. Here, m is a predetermined positive integer, such as m=32. Denote these N elements as $w_0, w_1, \ldots, w_{N-1}$. The elements $w_i$ (i=0, ..., N−1) may, therefore be viewed as elements of the finite ring $R=\mathbb{Z}/2^m\mathbb{Z}$, i.e. the ring of integers $\{0, 1, \ldots, 2^m-1\}$ with addition (+) modulo $2^m$ and multiplication (×) modulo $2^m$.

Define the predetermined function s as $s(w)=a \times b^N + \Sigma_{i=0}^{N-1}(w_i \times b^{N-1-i})$ so that s(w) is an output value corresponding to the input quantity of data w, where a and b are predetermined values in R. This can be expressed via a recurrence relationship:

$$h_0 = a$$

$$h_n = b \times h_{n-1} + w_{n-1} \text{ for } n=1, \ldots, N$$

setting $s(w) = h_N$ and, therefore, this is a general definition of the predetermined function s which can be used for all values of N.

The first combination function $c_1$ may then be defined in that, for each of the N elements $w_0, w_1, \ldots, w_{N-1}$ of w, the combination function $c_1$ generates respective modified versions of those N elements $w_0, w_1, \ldots, w_{N-1}$, referred to herein as N modified elements $w'_0, w'_1, \ldots, w'_{N-1}$, where $w'_i = w_i + s(w)$ (for $i=0, \ldots, N-1$) (using addition modulo $2^m$). Thus the combination function $c_1$ generates a modified amount of data w' from the initial amount of data w using the first value $v_1 = s(w)$, i.e. $w' = c_1(w, v_1)$ by replacing element $w_i$ in w with the corresponding modified element $w'_i$ (for $i=0, \ldots, N-1$).

Now:

$$s(w') = a \times b^N + \sum_{i=0}^{N-1} (w'_i \times b^{N-1-i}) \Rightarrow s(w') =$$

$$a \times b^N + \sum_{i=0}^{N-1} ((w_i + s(w)) \times b^{N-1-i}) \Rightarrow s(w') =$$

$$a \times b^N + \sum_{i=0}^{N-1} (w_i \times b^{N-1-i}) + \sum_{i=0}^{N-1} (s(w) \times b^{N-1-i}) \Rightarrow s(w') =$$

$$s(w) + \sum_{i=0}^{N-1} (s(w) \times b^{N-1-i}) \Rightarrow s(w') =$$

$$s(w) \times \left(1 + \sum_{i=0}^{N-1} b^{N-1-i}\right) \Rightarrow s(w) = s(w') \times \left(1 + \sum_{i=0}^{N-1} b^{N-1-i}\right)^{-1}$$

Thus, given the modified amount of data w', one can apply the predetermined function s to the modified amount of data w' to obtain a second value $v_2 = s(w')$. Then, the second combination function $c_2$ may be defined in that, for each of the N modified elements $w'_0, w'_1, \ldots, w'_{N-1}$ of the modified amount of data w', the combination function $c_2$ generates a new amount of data w'' from the modified amount of data w' using the second value $v_2$, i.e. $w'' = c_2(w', v_2)$ by replacing each modified element $w'_i$ in w' with the corresponding new element $w''_i$, where $w''_i = w'_i - s(w) \times k$ (for $i=0, \ldots, N-1$), where $k = (1 + \sum_{i=0}^{N-1} b^{N-1-i})^{-1}$ (here, the addition, subtraction and multiplication being modulo $2^m$). In this way, assuming w' has not been modified or corrupted since its initial creation, then $w''_i = w'_i - s(w) = w_i$ (for $i=0, \ldots, N-1$), so that the new amount of data w'' equals the original amount of data w.

In this example, the values a and b may be based on (or determined based at least in part on) a key K shared between the first entity 302 and the second entity 304 (e.g. by the key K being used as a seed for a random number generator to randomly select a and b from the ring R).

As mentioned above, the initial data $D_1$ (or w) may comprise one or more elements other than the N elements $E_0, \ldots, E_{N-1}$ (or $w_0, \ldots, w_{N-1}$). Let these B other elements be referred to as elements $z_0, \ldots, z_{B-1}$ (for some positive integer B). Then the function s could be modified to be $s(w) = a \times b^{N+B} + \sum_{i=0}^{N+B-1} (u_i \times b^{N+B-1-i})$, where $u_i$ is either one of the elements $w_0, \ldots, w_{N-1}$ or one of the elements $z_0, \ldots, z_{B-1}$ so that the unordered set $\{u_0, \ldots, u_{N+B-1}\}$ is the unordered set $\{w_0, \ldots, w_{N-1}, z_0, \ldots, z_{B-1}\}$. The combinations functions $c_1$ may stay the same, so that $c_1$ only modifies the elements $w_0, \ldots, w_{N-1}$ as set out above. Let sets S and T be defined as $S = \{i: 0 \le i < N+B \text{ and element } u_i \text{ is element } w_j \text{ for some } j\}$ and $T = \{i: 0 \le i < N+B \text{ and element } u_i \text{ is element } z_j \text{ for some } j\}$. Then for $i = 0, \ldots, N+B-1$, (a) if $u_i = w_j$ for some j, then let $u'_i = w_j + s(w)$; and (b) if $u_i = z_j$ for some j, then let $u'_i = z_j$. Thus, the combination function $c_1$ replaces, for each $i \in S$, the element $u_i$ with the modified element $u'_i$. Then $s(w) = a \times b^{N+B} + \sum_{i=0}^{N+B-1} (u_i \times b^{N+B-1-i}) = a \times b^{N+B} + \sum_{i \in S} (u_i \times b^{N+B-1-i}) + \sum_{i \in T} (u_i \times b^{N+B-1-i})$, in which case:

$$s(w') = a \times b^{N+B} + \sum_{i \in S} (u'_i \times b^{N+B-1-i}) + \sum_{i \in T} (u'_i \times b^{N+B-1-i}) \Rightarrow s(w') =$$

$$s(w) + \sum_{i \in S} (s(w) \times b^{N+B-1-i}) \Rightarrow s(w) = s(w') \times \left(1 + \sum_{i \in S} b^{N+B-1-i}\right)^{-1}$$

Thus, given the modified amount of data w', one can apply the predetermined function s to the modified amount of data w' to obtain a second value $v_2 = s(w')$. Then, the second combination function $c_2$ may be defined in that, for each of the N modified elements $w'_0, w'_1, \ldots, w'_{N-1}$ of the modified amount of data w', the combination function $c_2$ generates a new amount of data w'' from the modified amount of data w' using the second value $v_2$, i.e. $w'' = c_2(w', v_2)$ by replacing each modified element $w'_i$ in w' with the corresponding new element $w''_i$, where $w''_i = w'_i - s(w) \times k$ (for $i=0, \ldots, N-1$), where $k = (1 + \sum_{i \in S} b^{N+B-1-i})^{-1}$ (here, the addition, subtraction and multiplication being modulo $2^m$). In this way, assuming w' has not been modified or corrupted since its initial creation, then $w''_i = w'_i - s(w) = w_i$ (for $i=0, \ldots, N-1$), so that the new amount of data w'' equals the original amount of data w.

Thus, this is an example of the predetermined function s being based on (or operating on) other elements ($z_0, \ldots, z_{B-1}$) of the initial data w (or $D_1$) in addition to the N elements which are modified. It will be appreciated that, additionally or alternatively, the combination function $c_1$ (and, correspondingly, the combination function $c_2$) may modify one or more elements of the initial data w (or $D_1$) in addition to the elements used when applying the predetermined function s.

It will be appreciated that embodiments of the invention may make use of other functions s, $c_1$ and $c_2$ that have the above-mentioned relationship that, for any amount of data w, $c_2(c_1(w, s(w)), s(c_1(w, s(w)))) = w$.

Figure 5:
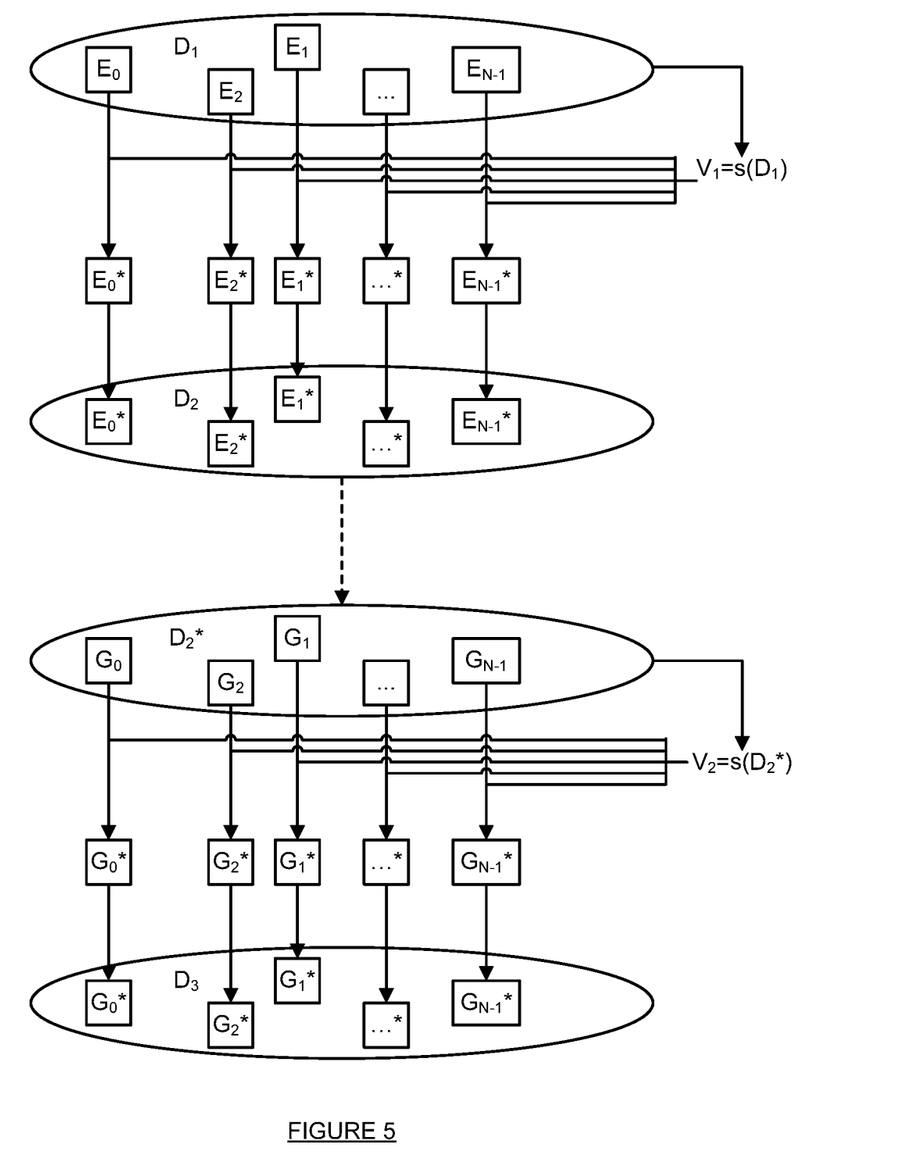
FIG. 5 schematically illustrates the example implementation of the embodiments illustrated in FIGS. 3 and 4.

FIG. 5 schematically illustrates the application of the first above-mentioned example to the embodiments illustrates in FIGS. 3 and 4. In particular, FIG. 5 illustrates how an initial amount of data $D_1$ (or w) may comprise a plurality of elements $E_0, \ldots, E_{N-1}$ (or $w_0, \ldots, w_{N-1}$). The step 402 involves determining the value $V_1$ (or $v_1$) based on the data $D_1$ (and, preferably, based on the plurality of elements $E_0, \ldots, E_{N-1}$). The step 404 involves replacing these N elements with modified elements $E_0^*, \ldots, E_{N-1}^*$ (or $w'_0, \ldots, w'_{N-1}$) to generate a second amount of data $D_2$ (or w'). The amount of data $D_2^*$ obtained at the step 408 comprises a corresponding plurality of elements $G_0, \ldots, G_{N-1}$. Assuming there has been no modification or corruption of the second amount of data $D_2$, then $D_2^* = D_2$, so that $G_i = E_i^*$ for $i = 0, \ldots, N-1$. Then, the step 410 involves determining the value $V_2$ (or $v_2$) based on the data $D_2^*$ (and, preferably, based on the elements $G_0, \ldots, G_{N-1}$ (or $w'_0, \ldots, w'_{N-1}$)). The step 412 involves replacing these N modified elements with new elements $G_0^*, \ldots, G_{N-1}^*$ (or $w''_0, \ldots, w''_{N-1}$) to generate a third amount of data $D_3$ (or $w''$). Assuming there has been no modification or corruption of the second amount of data $D_2$, then $D_3 = D_1$, so that at the step 412, the second entity 304 processes the first amount of data $D_1$ (by virtue of processing the data $D_3$).

As discussed above, it will be appreciated that the data $D_1$ (or w) may comprise a number M of elements, where M≥N, $H_0, \ldots, H_M$. For example, the data $D_1$ (or w) may comprise an ordered sequence of M elements $H_0, \ldots, H_M$. The N elements $E_0, \ldots, E_{N-1}$ (or $w_0, \ldots, w_{N-1}$) may then be N of the M elements of the data $D_1$ (or w). The N elements $E_0, \ldots, E_{N-1}$ (or $w_0, \ldots, w_{N-1}$) may be N randomly selected elements from the M elements of the data $D_1$ (or w). The N elements $E_0, \ldots, E_{N-1}$ (or $w_0, \ldots, w_{N-1}$) may be N of the M elements of the data $D_1$ (or w) in a different order (potentially a randomly selected order) from that in which those N elements occur in the data $D_1$ (or w). This selection (or choice) of the N elements, and/or this ordering, may be based on (or determined at least in part on) a key K shared between the first entity 302 and the second entity 304 (e.g. by the key K being used as a seed for a random number generator).

In particular, if the data $D_1$ (or w) comprises a number M=N of elements $H_0, \ldots, H_N$, then the N elements $E_0, \ldots, w_{N-1}$ (or $w_0, \ldots, w_{N-1}$) may be the N elements $H_0, \ldots, H_N$ of the data $D_1$ (or w) in a particular order, i.e. $E_i = H_{p(i)}$ for some permutation p of the set of integers $\{0, 1, \ldots, N-1\}$. This permutation may be based on (or determined at least in part on) a key K shared between the first entity 302 and the second entity 304 (e.g. by the key K being used as a seed for a random number generator).

It will be appreciated that the methods described have been shown as individual steps carried out in a specific order. However, the skilled person will appreciate that these steps may be combined or carried out in a different order whilst still achieving the desired result.

It will be appreciated that embodiments of the invention may be implemented using a variety of different information processing systems. In particular, although the figures and the discussion thereof provide an exemplary computing system and methods, these are presented merely to provide a useful reference in discussing various aspects of the invention. Embodiments of the invention may be carried out on any suitable data processing device, such as a personal computer, laptop, personal digital assistant, mobile telephone, set top box, television, server computer, etc. Of course, the description of the systems and methods has been simplified for purposes of discussion, and they are just one of many different types of system and method that may be used for embodiments of the invention. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality may be implemented as one or more corresponding modules as hardware and/or software. For example, the above-mentioned functionality may be implemented as one or more software components for execution by a processor of the system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or other hardware arrangements. Method steps implemented in flowcharts contained herein, or as described above, may each be implemented by corresponding respective modules; multiple method steps implemented in flowcharts contained herein, or as described above, may be implemented together by a single module.

It will be appreciated that, insofar as embodiments of the invention are implemented by a computer program, then one or more storage media and/or one or more transmission media storing or carrying the computer program form aspects of the invention. The computer program may have one or more program instructions, or program code, which, when executed by one or more processors (or one or more computers), carries out an embodiment of the invention. The term "program" as used herein, may be a sequence of instructions designed for execution on a computer system, and may include a subroutine, a function, a procedure, a module, an object method, an object implementation, an executable application, an applet, a servlet, source code, object code, byte code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

The invention claimed is:

1. A method for a first entity to protect a first amount of data and to enable a second entity to perform authenticated data processing based on the first amount of data, the method comprising the first entity:
   generating a first value by applying a predetermined function to the first amount of data, the predetermined function being a function for which application of the predetermined function to an input quantity of data generates a corresponding output value, and the predetermined function has a property that, given a second quantity of data generated by modifying each of a number N of elements of a first quantity of data by combining, using a first combination function, each of those N elements of the first quantity of data with the output value generated by applying the predetermined function to the first quantity of data, the first quantity of data is regenerated from the second quantity of data by combining, using a second combination function, each of the N modified elements with the output value produced by applying the predetermined function to the second quantity of data; and
   generating a second amount of data for the second entity to process, said generating comprising combining, using the first combination function, each of N of elements of the first amount of data with the first value to thereby allow the second entity to perform authenticated data processing based on the first amount of data to achieve intended functionality without the second entity having to perform an explicit verification step on received data.

2. The method of claim 1, comprising providing the second amount of data to the second entity.

3. A method for a second entity to perform authenticated data processing based on a first amount of data, the method comprising the second entity:

obtaining a second amount of data;
generating a second value by applying a predetermined function to the second amount of data, the predetermined function being a function for which application of the predetermined function to an input quantity of data generates a corresponding output value, and the predetermined function has a property that, given a second quantity of data generated by modifying each of a number N of elements of a first quantity of data by combining, using a first combination function, each of those N elements of the first quantity of data with the output value generated by applying the predetermined function to the first quantity of data, the first quantity of data is regenerated from the second quantity of data by combining, using a second combination function, each of the N modified elements with the output value produced by applying the predetermined function to the second quantity of data;
generating the first amount of data by combining, using the second combination function, each of N of elements of the second amount of data with the second value; and
performing authenticated data processing based on the generated first amount of data to thereby achieve intended functionality without the second entity having to perform an explicit verification step on received data.

4. The method of claim 3, comprising the first entity:
generating a first value by applying the predetermined function to the first amount of data; and
generating the second amount of data by combining, using the first combination function, each of N of elements of the first amount of data with the first value.

5. The method of claim 3, wherein the predetermined function has a property that it is computationally infeasible to determine a third quantity of data, different from the second quantity of data, from which the first quantity of data is regenerated by combining, using the second combination function, each of N elements of the third quantity of data with the output value produced by applying the predetermined function to the third quantity of data.

6. The method of claim 3, wherein the N elements are chosen based on a key.

7. The method of claim 3, wherein the predetermined function is a function s defined by:

$$s(w) = a \times b^N + \sum_{i=0}^{N-1} (w_i \times b^{N-1-i})$$

where:
w is an input quantity of data and s(w) is a corresponding output value generated by the predetermined function corresponding to the amount of data w;
a and b are predetermined values; and
$w_0, w_1, \ldots, w_{N-1}$ are N elements of the amount of data w.

8. The method of claim 7, wherein a and b are values determined based on a key.

9. The method of claim 7, wherein the quantity of data w comprises an ordered sequence of at least N elements and the N elements $w_0, w_1, \ldots, w_{N-1}$ are randomly selected from the ordered sequence of at least N elements.

10. The method of claim 9, wherein the random selection is seeded by a key.

11. The method of claim 7, wherein said combining, using the first combination function, each of N of elements of the first quantity of data with the output value generated by applying the predetermined function to the first quantity of data comprises, for i=0, ..., N−1, adding s(w) to $w_i$ using modulo arithmetic to generated the respective modified element $w'_i$.

12. The method of claim 11, wherein said combining, using the second combination function, each of the N modified elements with the output value produced by applying the predetermined function to the second quantity of data comprises, for i=0, ..., N−1, subtracting $$s(w') \times \left(1 + \sum_{i=0}^{N-1} b^{N-1-i}\right)^{-1}$$

from $w'_i$ where w' is the second quantity of data.

13. The method of claim 3, wherein the first amount of data or the second amount of data has a total number M of elements, wherein N=M.

14. The method of claim 3, wherein the first amount of data or the second amount of data has a total number M of elements, wherein N<M.

15. An apparatus comprising a memory and one or more processors arranged to protect a first amount of data and to enable a second entity to perform authenticated data processing based on the first amount of data, the one or more processors arranged to:
generate a first value by applying a predetermined function to the first amount of data, the predetermined function being a function for which application of the predetermined function to an input quantity of data generates a corresponding output value, and the predetermined function has a property that, given a second quantity of data generated by modifying each of N of elements of a first quantity of data by combining, using a first combination function, each of those N elements of the first quantity of data with the output value generated by applying the predetermined function to the first quantity of data, the first quantity of data is regenerated from the second quantity of data by combining, using a second combination function, each of the N modified elements with the output value produced by applying the predetermined function to the second quantity of data; and
generate a second amount of data for the second entity to process, wherein generating the second amount of data comprises combining, using the first combination function, each of N of elements of the first amount of data with the first value to thereby achieve intended functionality without the second entity having to perform an explicit verification step on received data.

16. The method of claim 1, wherein the predetermined function has a property that it is computationally infeasible to determine a third quantity of data, different from the second quantity of data, from which the first quantity of data is regenerated by combining, using the second combination function, each of N elements of the third quantity of data with the output value produced by applying the predetermined function to the third quantity of data.

17. The method of claim 1, wherein the N elements are chosen based on a key.

18. The method of claim 1, wherein the predetermined function is a function s defined by:

$$s(w) = a \times b^N + \sum_{i=0}^{N-1} (w_i \times b^{N-1-i})$$

where:
w is an input quantity of data and s(w) is a corresponding output value generated by the predetermined function corresponding to the amount of data w;
a and b are predetermined values; and
$w_0, w_1, \ldots, w_{N-1}$ are N elements of the amount of data w.

19. The method of claim 18, wherein a and b are values determined based on a key.

20. The method of claim 18, wherein the quantity of data w comprises an ordered sequence of at least N elements and the N elements $w_0, w_1, \ldots, w_{N-1}$ are randomly selected from the ordered sequence of at least N elements.

21. The method of claim 20, wherein the random selection is seeded by a key.

22. The method of claim 18, wherein said combining, using the first combination function, each of N of elements of the first quantity of data with the output value generated by applying the predetermined function to the first quantity of data comprises, for i=0, ..., N−1, adding s(w) to $w_i$ using modulo arithmetic to generated the respective modified element $w'_i$.

23. The method of claim 22, wherein said combining, using the second combination function, each of the N modified elements with the output value produced by applying the predetermined function to the second quantity of data comprises, for i=0, ..., N−1, subtracting $$s(w') \times \left(1 + \sum_{i=0}^{N-1} b^{N-1-i}\right)^{-1}$$

from $w'_i$, where w' is the second quantity of data.

24. The method of claim 1, wherein the first amount of data or the second amount of data has a total number M of elements, wherein N=M.

25. The method of claim 1, wherein the first amount of data or the second amount of data has a total number M of elements, wherein N<M.

26. An apparatus comprising a memory and one or more processors arranged to perform authenticated data processing based on a first amount of data, the one or more processors arranged to:
obtain a second amount of data;
generate a second value by applying a predetermined function to the second amount of data, the predetermined function being a function for which application of the predetermined function to an input quantity of data generates a corresponding output value, and the predetermined function has a property that, given a second quantity of data generated by modifying each of N of elements of a first quantity of data by combining, using a first combination function, each of those N elements of the first quantity of data with the output value generated by applying the predetermined function to the first quantity of data, the first quantity of data is regenerated from the second quantity of data by combining, using a second combination function, each of the N modified elements with the output value produced by applying the predetermined function to the second quantity of data;
generate the first amount of data by combining, using the second combination function, each of N of elements of the second amount of data with the second value; and
perform data processing based on the generated first amount of data to thereby achieve intended functionality without the apparatus having to perform an explicit verification step on received data.

* * * * *